Jan. 5, 1932.   W. L. BATEN ET AL   1,839,730
SAFETY VALVE
Filed March 20, 1930
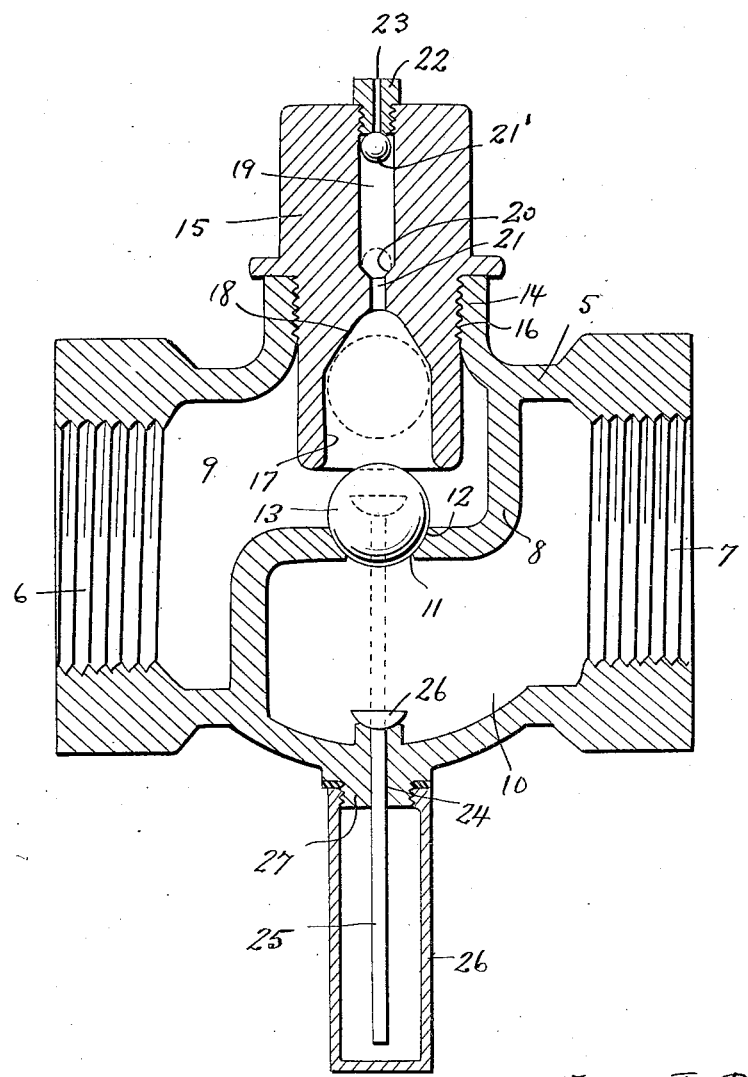
Inventor
William L. Baten
Joseph R. Bevill
By Clarence A. O'Brien
Attorney Patented Jan. 5, 1932

1,839,730

UNITED STATES PATENT OFFICE

WILLIAM L. BATEN AND JOSEPH R. BEVILL, OF HAYNESVILLE, LOUISIANA

SAFETY VALVE

Application filed March 20, 1930. Serial No. 437,501.

This invention relates to valves, and has as its primary object to provide certain new and useful improvements in safety valves.

A primary object of this invention is to provide a valve having means associated therewith whereby the ball elements of the valve may be manually moved from one seated position to another seated position and retained in the last mentioned seated position under action of the pressure passing through the valve so that when pressure ceases in the valve casing, the valve by gravity will fall to a seated position thus closing the valve.

A still further object of the invention is to provide a valve of the character above mentioned, which is comparatively simple in construction, thoroughly reliable, practical and efficient in operation and otherwise well adapted for the purpose designed.

With the above and numerous other objects and advantages of the invention will become apparent during a study of the following description taken in connection with the accompanying drawing, wherein the single view therein illustrated is a vertical longitudinal sectional view taken through the valve embodying the features of the present invention.

With reference more in detail to the drawing it will be seen that our improved valve comprises a casing designated generally by the reference character 5 and having oppositely disposed inlet and exhaust ports 6 and 7 respectively, said ports being internally threaded as shown so that the valve may be suitably coupled within a water lining or the like.

Interposed between the inlet and outlet port, there is arranged within the casing 5 a partition 8 dividing the casing into a chamber 9 communicating with the intake port 6, and a chamber 10 communicating with the exhaust port 7. The horizontal portion of the partition 8 has an opening or passage 11 formed therein affording communication between the passages 9 and 10, and within the opening 11 is formed a suitable seat 12 for a ball valve 13.

At the top thereof the casing 5 is provided with an internally threaded neck 14, and a plug 15 is threaded within the neck 14 as at 16, the lower end of the plug 15 extending into the chamber 9 above the horizontal portion of the partition 8 as clearly disclosed.

Opening inwardly from said lower end, the plug 15 is provided with a socket 17 which socket 17 at its upper end merges into a suitable valve seat 18 for a purpose to be hereinafter more fully set forth. Opening inwardly from the upper and outer end, the plug 15 is provided with a longitudinal valve chamber 19 provided at its inner end with a valve seat 20 upon which is normally seated a ball valve 21' operable within the chamber 19.

An axial bore 21 extends through the plug 15 from the seat 20 to the seat 18. A closure cap 22 is threaded in the upper end of the chamber 19 and this cap 22 has an axial bore 23 formed therein providing a vent opening controlled by the relatively smaller ball valve 21'.

In the bottom thereof directly below the opening 11 the casing 5 is provided with a vertical bore 24 in which is slidable a rod 25, the upper end of the rod 25 provided with an enlarged head 26 normally seated on the bottom of the casing 5. The other end of the rod 25 extends outwardly of the casing and is normally encased within a suitable protector casing or cylinder 26 threaded at its upper opened end to a depending lug 27 formed integral with the bottom of the casing 5 as clearly illustrated.

The operation of our improved valve may be briefly stated as follows:

Normally, the parts are in the positions suggested by full lines in the drawing, and at which time pressure is confined in the chamber 9, certain of the pressure acting on the ball valve 21' to retain it in its uppermost position. To permit passage of the water or other fluid from the chamber 9 into the chamber 10, casing 26 is removed, and with the finger, stem 25 is moved upwardly so that the head at the upper end of the stem engages the ball valve 13 urging the same from its seat 12 into the socket 17 to assume the dotted line position shown in the drawing, thus permitting passage of fluid from the chamber 9 to the chamber 10, it being understood, that the rod 25 is allowed to drop back to its full line position subsequent to the placing of the ball valve 13 in the dotted line position within in the socket 17.

As the valve 13 is moved upwardly in the socket 17, there is of course a decrease of pressure in the chamber 9 with a proportionate decrease of pressure in the valve chamber 19 permitting the ball valve 21' to descend to the dotted line position suggested in the drawing for engagement with the seat 20, thus cooperating with the valve 13 in its dotted line position for closing communication between the chamber 9 and the chamber 19.

The fluid passing from the chamber 9 into the chamber 10 will provide sufficient pressure for returning the valve 13 in its dotted line position as is thought apparent. When the flow of fluid to chamber 9 is cut off by any suitable means not shown, pressure of the fluid passing from chamber 9 to chamber 10 will consequently decrease, permitting the valve 13 to return to its normal position engaging seat 12, when the flow to chamber 9 may be then repeated so as to provide sufficient pressure in the chamber 9 as to utilize certain of the pressure for acting on the ball valve 21 to move the same upwardly to its full line position shown in Figure 1, thus completely closing the valve against the escape of pressure, and against passage of fluid from the chamber 9 to the chamber 10.

Even though we have herein shown and described the preferred embodiment of our invention, it is to be understood that the same is susceptible to changes fully comprehended by the spirit of the invention as herein described, and the scope of the appended claim.

Having thus described our invention what we claim as new is:

In a safety valve of the class described, a valve casing having oppositely disposed inlet and outlet ports, a partition arranged in the casing having an opening formed therein providing a valve seat, a ball valve normally disposed on said seat, a plug extending inwardly from the top of the casing above said valve seat, said plug having its inner end provided with a socket merging at its inner end into a secondary valve seat in alinement with the first mentioned valve seat, and a rod slidable through the bottom of said casing for moving said ball valve from said first mentioned seat into engagement with the second mentioned seat, a protector casing depending from the bottom of the first mentioned valve casing for receiving the lower end of said rod, and said plug having an axial valve chamber arranged therein communicating with said socket and being provided with a valve seat at the inner end thereof, a vent cap threaded in said plug closing the outer end of said last mentioned chamber, and a ball valve operable in said last mentioned chamber and cooperating with said valve seat therein.

In testimony whereof we affix our signatures.

WILLIAM L. BATEN.
JOSEPH R. BEVILL.